G. R. BAIR.
RESILIENT WHEEL.
APPLICATION FILED MAR. 8, 1913.
1,137,375.
Patented Apr. 27, 1915.
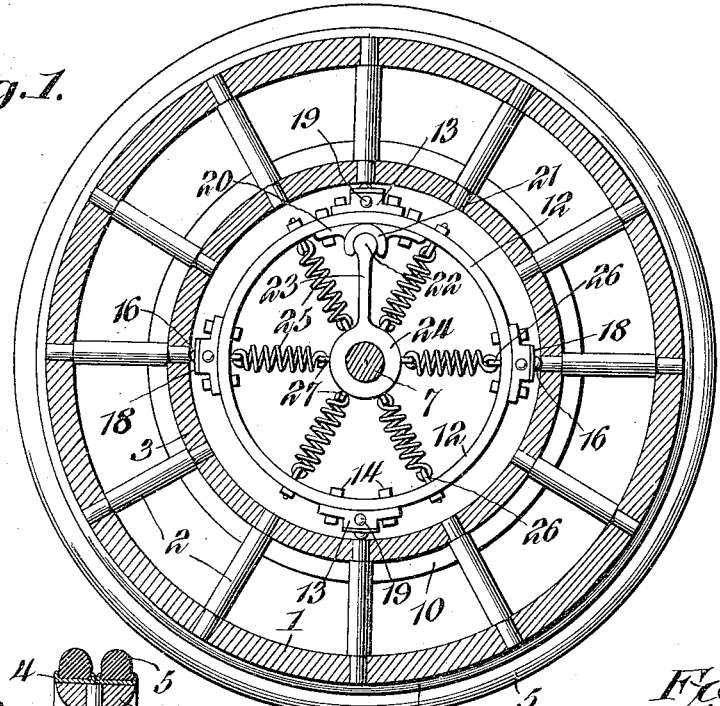
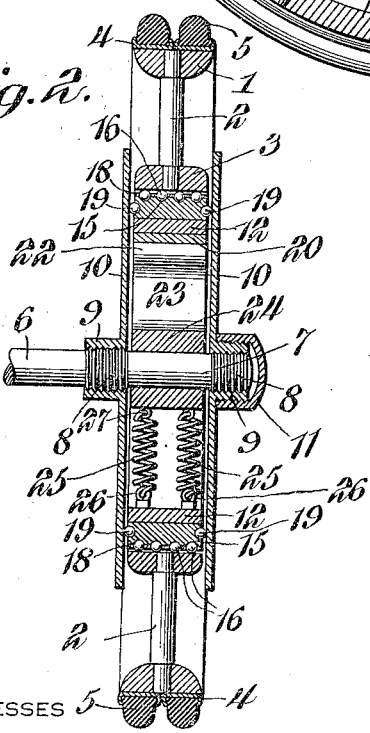
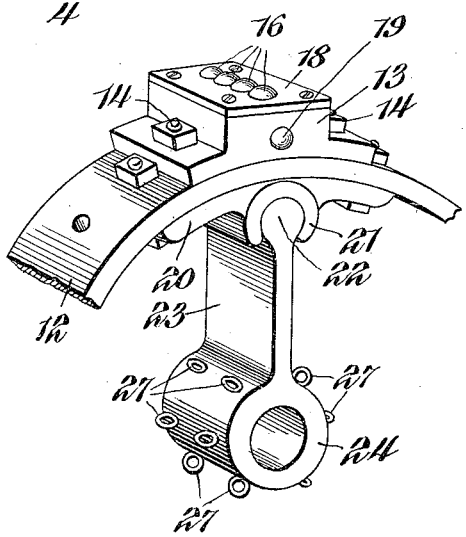
WITNESSES
Howard N. Orr.
F. T. Chapman.
George R. Bair, INVENTOR,
BY
ATTORNEY

UNITED STATES PATENT OFFICE.

GEORGE RICHARDS BAIR, OF BELTON, MISSOURI, ASSIGNOR OF ONE-HALF TO WALTER S. ALLEN, OF BELTON, MISSOURI.

RESILIENT WHEEL.

1,137,375.   Specification of Letters Patent.   Patented Apr. 27, 1915.

Application filed March 8, 1913. Serial No. 752,960.

*To all whom it may concern:*

Be it known that I, GEORGE R. BAIR, a citizen of the United States, residing at Belton, in the county of Cass and State of Missouri, have invented a new and useful Resilient Wheel, of which the following is a specification.

This invention has reference to improvements in resilient wheel structures, and its object is to provide a wheel and a structure between it and the axle which will relieve the vehicle from sudden jars and jolts such as occur when the wheel strikes an obstruction.

The invention comprises a wheel structure having a non-rotatable member in which an axle spindle may be lodged, so that the non-rotatable member and the axle have relative freedom of movement, while the wheel surrounds the non-rotatable member. The construction is such that when the vehicle is at rest the axle is supported by the non-rotatable member in substantially the axis of the wheel, but when the wheel meets an obstruction the body of the vehicle instead of being suddenly arrested as with ordinary wheels may move with relation to the wheels for a short distance against the elastic resisting tendency of springs, wherefore the sudden shock or jar is taken up to an extent thus relieving the vehicle.

The invention will be best understood from a consideration of the following detailed description, taken in connection with the accompanying drawings forming a part of this specification with the further understanding that while the drawings show a practical embodiment of the invention the latter is not confined to any strict conformity with the showing of the drawings but may be changed and modified so long as such changes and modifications mark no material departure from the salient features of the invention.

In the drawings:—Figure 1 is a central section through a wheel constructed in accordance with the present invention, said section being in a plane perpendicular to the longitudinal axis of the wheel and showing some parts in elevation. Fig. 2 is a diametric axial section of the wheel. Fig. 3 is a fragmentary perspective view on an enlarged scale of a portion of the non-rotatable member.

Referring to the drawings, there is shown a felly 1 connected by spokes 2 to a hub 3 of an interior diameter to receive certain parts to be described. The felly 1 may have upon its exterior a suitable rim 4 carrying a tire 5 which may be of the solid form, such tire answering for the purposes of the present invention, but this does not preclude the use of a pneumatic tire if such be desired.

There is shown a portion of an axle 6 terminating in a spindle 7 which may be threaded at spaced points, as indicated at 8 to receive threaded collars 9 at the central portions of disks 10, these disks being of a diameter which may be somewhat greater than the diameter of the hub 3 and the disks are disposed on opposite sides of the hub 3, while the outer end of the spindle 7 may be covered by a cap nut 11 screwed on to the sleeve 9 of the outer disk.

The disks 10 and hub 3 define a chamber in which is lodged a ring 12 of somewhat smaller diameter than the inner diameter of the hub 3 to accommodate certain structures to be described, and of a gage to amply support such weight as the wheel is designed to carry. At suitable points around the outer periphery of the ring 12 there are secured blocks 13 by means of bolts 14 or other fastening devices, and these blocks are formed on their outer faces with pockets 15 for anti-friction balls 16 which may be held in place by a cap plate 18 and at opposite sides of the blocks 13 are formed cavities for the reception of anti-friction balls 19. It is customary to provide a row of balls 16 extending in the direction of the axis of rotation of the wheel, while a single ball 19 at each end of the block 13 will answer the purposes of the invention, these last-named balls being designed to engage the inner faces of the disks 10, while the balls 16 are designed to engage the inner periphery of the felly 3.

Secured to the inner periphery of the ring 12 at a point which will correspond to the upper portion of this ring when properly located on a vehicle is a bracket 20 having at its central portion an incomplete cylindrical member 21 opening toward the axis of rotation of the wheel and lodged in this cylindrical member is a cylindrical terminal portion 22 of a web 23, the other end of which is formed into a hollow cylinder 24 designed to embrace the spindle 7, but in action the cylindrical termination 22 and the cylinder 24 have but small relative movement with respect to the partial cylindrical member 21, which may be termed a socket, and the axle spindle 7.

Extending from the ring 12 to the cylinder 24 are springs 25 which may be in the form of helical springs each with one end made fast to an eye 26 in turn fast to the ring 12, and at the other end made fast to an eye 27 in turn made fast to the outer surface of the cylinder 24. Since these springs have at times to take up considerable shocks they may be arranged in pairs with the two members of each pair displaced in the same direction as the longitudinal axis of the wheel, but the invention is not confined to any particular arrangement of the springs so long as the purpose demanded of them is accomplished.

When the vehicle is at rest the web 23 is pendent and the weight of the vehicle is sustained directly by said web hung from the socket 21, the weight being transmitted through the rim 12 to the lower block 13 and anti-friction balls 16 to the hub 3 and by appropriate spokes 2 to the felly 1 and the tire 5. When the vehicle is in motion any resistance met by the wheel will tend to cause the wheel to lag with reference to the vehicle, thus swinging the web 23 on the flexible joint formed by the socket 21 and the cylinder 22, and this lag of the wheel is transmitted to the springs 25, certain of which compress and others expand so that there is then an elastic action between the wheel and the vehicle and should the wheel then meet a large obstruction the web 23 being swung to one side of the vertical will yield more readily to such obstruction, so that the impact of the obstruction instead of being transmitted directly to the vehicle in the form of a sharp shock is in a large measure taken up by the springs, so that if such shock ultimately reaches the vehicle it is reduced to such an extent as to be immaterial. The swinging of the web 23 causes a changed relation between the spindle 7 and the wheel, but the disks 10 are sufficiently extensive to still cover the hub 3, although no longer concentric therewith but eccentric thereto. This motion is taken care of by the anti-friction balls 19, while the rotation of the felly 3 with respect to the ring 12 is taken care of by the anti-friction balls 16, so that the wheel under all circumstances has anti-friction bearings between it and the non-rotatable member.

What is claimed is:—

1. A wheel structure comprising two concentric members, the outer one of which constitutes the wheel proper, and is freely rotatable on the inner member, an axle receiving and supporting member having a radial arm pivotally connected to and pendently hung from the inner one of the concentric members, and elastic means between the axle-receiving member and the inner one of the concentric members, whereby under the action of a force obstructive to the progress of the wheel the axle supporting end of the radial arm will swing on the pivot connection between it and the inner one of the concentric members against the restraining action of the elastic means.

2. A wheel structure comprising two concentric members, the outer one of which is freely rotatable on the inner one and constitutes the wheel proper, an axle receiving and supporting member having an inflexible radial arm pivotally connected to and pendently hung from the inner one of the concentric members, and centralizing elastic means between the axle receiving member and the inner one of the concentric members, whereby under the action of a force obstructive to the progress of the wheel the axle supporting end of the radial arm will swing on the pivot connection between it and the inner one of the concentric members against the restraining action of the elastic means.

3. A wheel structure comprising two concentric members, the outer one of which is freely rotatable and constitutes the wheel proper, an axle receiving and supporting member having an inflexible and axially elongated radial arm pivotally connected to and pendently hung from the inner one of the concentric members, with the pivot connection also axially elongated, and a circular series of radially-disposed extension springs connected at the ends to the axle receiving member and the inner one of the concentric members, respectively, for centralizing the axle receiving members with respect to said inner one of the concentric members, whereby under the action of a force obstructive to the progress of the wheel the axle supporting end of the radial arm will swing on the pivot connection between it and the inner one of the concentric members against the restraining action of the springs.

4. A wheel structure comprising a rotatable member constituting the wheel proper, a ring therewithin upon which the wheel rotates, a normally pendent arm pivotally connected at its upper end to a high point of the ring and at its lower end provided with means for encircling an axle so as to be rockable thereon, and a circular series of springs connected at their ends to the axle encircling means and the ring respectively, to normally centralize the pendent member in the ring.

5. A wheel structure comprising a rotatable wheel having a ring-shaped hub, a ring within the hub and upon which the wheel rotates, a normally pendent rockable member pivotally connected at its upper end to a high point of the ring and at its lower ends provided with means for receiving an axle and rockable thereon, and a circular series of pairs of springs in normally radial relation to the ring and each connected at the ends to the part of the pendent member encircling the axle and to the ring, respectively, the springs being spaced apart axially as well as circularly.

6. A wheel structure comprising a wheel having a felly, tire, spokes, and a ring-shaped hub, a ring interior to the hub and provided with bearings engaging the inner face of the hub and upon which the wheel may rotate, a normally pendent rockable arm having an axially elongated pivotal connection to the ring at a high point thereof and at the other end provided with a cylindrical axially extended portion for receiving an axle, and a circular series of equally spaced and normally radial springs each connected at the ends to the cylindrical portion of the pendent member and the ring, respectively, and having a normal tendency to centralize the axle receiving portion of the pendent member with respect to the ring from which it is hung.

In testimony, that I claim the foregoing as my own, I have hereto affixed my signature in the presence of two witnesses.

GEORGE RICHARDS BAIR.

Witnesses:
J. E. MULLEN,
W. A. ROBERTS.

Copies of this patent may be obtained for five cents each, by addressing the "Commissioner of Patents, Washington, D. C."